United States Patent
Huang et al.

(10) Patent No.: US 9,310,632 B2
(45) Date of Patent: Apr. 12, 2016

(54) LIQUID CRYSTAL LENS DEVICE AND METHOD FOR DRIVING LIQUID CRYSTAL LENS DEVICE

(71) Applicant: AU OPTRONICS CORP., Hsin-Chu (TW)

(72) Inventors: Chih-Yuan Huang, Hsin-Chu (TW); Sheng-Ju Ho, Hsin-Chu (TW); I-Wei Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 243 days.

(21) Appl. No.: 14/145,085

(22) Filed: Dec. 31, 2013

(65) Prior Publication Data

US 2015/0009435 A1  Jan. 8, 2015

(30) Foreign Application Priority Data

Jul. 8, 2013  (TW) .............................. 102124429 A

(51) Int. Cl.
  *G02F 1/133*  (2006.01)
  *G02F 1/1343*  (2006.01)
  *G02B 27/22*  (2006.01)
  *H04N 13/04*  (2006.01)

(52) U.S. Cl.
  CPC ........ *G02F 1/13306* (2013.01); *G02B 27/2214* (2013.01); *G02F 1/134309* (2013.01); *H04N 13/042* (2013.01); *G02F 2203/28* (2013.01); *H04N 2213/001* (2013.01)

(58) Field of Classification Search
  CPC ............ G09G 3/3696; G09G 2300/0495; H04N 13/00; H04N 2013/00; H04N 13/042; H04N 2213/001; G02B 27/22; G02B 27/02; G02B 27/2214; G02F 1/13306; G02F 1/134309; G02F 2203/28
  See application file for complete search history.

(56) References Cited

U.S. PATENT DOCUMENTS 7,215,475 B2  5/2007  Woodgate et al.
7,250,923 B2  7/2007  Taira et al.

(Continued)

FOREIGN PATENT DOCUMENTS

JP  2004313562  11/2004

OTHER PUBLICATIONS

Shota Wakita et al., "High-speed liquid-crystal optical deflector for 3-D display", 2009, vol. 7237, 723724-1-723724-10, SPIE-IS&T.

*Primary Examiner* — Kumar Patel
*Assistant Examiner* — Amy C Onyekaba
(74) *Attorney, Agent, or Firm* — WPAT, P.C.; Justin King

(57) ABSTRACT

A liquid crystal (LC) lens device and a method for driving the LC lens device are provided. The LC lens device includes an LC lens array and a driving device, and the LC lens array includes LC lenses in parallel. Each LC lens includes a first substrate, first electrodes disposed on the first substrate, a second substrate, second electrodes on the second substrate, and an LC layer disposed between the first electrodes and the second electrodes to form a Fresnel lens. The driving device is electrically connected to the second electrodes of each LC lens, and provides driving voltages respectively to each of the second electrodes in an order starting from the second electrodes disposed at the edges of the Fresnel lens and ending at the second electrode disposed at the middle of a main lobe region of the Fresnel lens, and there is a preset time difference between driven starting times of every adjacent two second electrodes.

18 Claims, 9 Drawing Sheets

(56) References Cited

U.S. PATENT DOCUMENTS

| | | |
|---|---|---|
| 8,004,179 B2 | 8/2011 | Woodgate et al. |
| 8,174,465 B2 | 5/2012 | Takagi et al. |
| 8,351,004 B2 | 1/2013 | Chiu et al. |
| 2011/0102689 A1 | 5/2011 | Chiu |
| 2011/0228181 A1* | 9/2011 | Jeong .................... G02B 5/1842 349/15 |
| 2012/0105753 A1* | 5/2012 | Sakamoto ........... G02B 27/2214 349/33 |
| 2012/0162592 A1* | 6/2012 | Takagi ............... G02B 27/2214 349/139 |
| 2012/0268816 A1 | 10/2012 | Bae et al. |
| 2013/0222714 A1* | 8/2013 | Uehara ............... H04N 13/0235 349/15 |
| 2013/0250223 A1* | 9/2013 | Takagi .............. G02F 1/134336 349/138 |
| 2014/0118647 A1* | 5/2014 | Momonoi ........... G02B 27/2214 349/33 |

\* cited by examiner providing driving voltages respectively to each of the second electrodes in an order starting from the second electrodes disposed at the edges of the Fresnel lens and ending at the second electrode disposed at the middle of the main lobe region , and there is a preset time difference between driven starting times of every adjacent two second electrodes ~S902

FIG. 9

LIQUID CRYSTAL LENS DEVICE AND METHOD FOR DRIVING LIQUID CRYSTAL LENS DEVICE

FIELD OF THE INVENTION

The present invention relates to a display device, and more particularly to a liquid crystal (LC) lens device employed in a three-dimensional (3D) display device and a method for driving the LC lens device.

BACKGROUND OF THE INVENTION

FIG. 1 is a schematic view of a typical 3D display device. Referring to FIG. 1, the 3D display device 100 includes an LC display panel 110 and an LC lens device 120. The LC lens device 120 includes an LC lens array 130 and a driving device 140. Viewing a display surface of the LC lens array 130 along a direction X, it is can be seen that the LC lens array 130 includes a plurality of LC lenses arranged in parallel, as shown in FIG. 2. FIG. 2 is a top view of the LC lens array 130 along the direction X of FIG. 1, and numeral 132 represents an LC lens.

The 3D display device 100 can operate respectively in a two-dimensional (2D) display mode and a 3D display mode. FIG. 3 is a schematic cross-sectional view of each LC lens 132 in the 2D display mode. Referring to FIG. 3, each LC lens 132 includes an upper substrate 132-1, an upper electrode 132-2, an LC layer 132-3, a plurality of lower electrodes 132-4, and a lower substrate 132-5. Each of the lower electrodes 132-4 is electrically connected the driving device 140 to receive driving voltages provided by the driving device 140. In the 2D display mode, each of the lower electrodes 132-4 of the LC lens 132 is not supplied with the driving voltages, and accordingly LC molecules of the LC layer 132-3 are arranged in parallel to the upper electrode 132-2. Thus lights passed through the LC layer 132-3 have no refractive index difference, and the 3D display device 100 can operate in the 2D display mode.

FIG. 4 is a schematic cross-sectional view of each LC lens 132 in the 3D display mode. Referring to FIG. 4, the same numeral as that in FIG. 3 represents the same component as that in FIG. 3. In additional, labels V1-V4 shown in FIG. 4 respectively represent the driving voltage supplied to corresponding lower electrode 132-4. Due to values of the driving voltages V1-V4 being from the maximum to the minimum according to an order from the driving voltage V1 to the driving voltage V4, that is, the driving voltage V1 is the maximum and supplied to the right-side lower electrode 132-4 and the left-side lower electrode 132-4, and the driving voltage V4 is the minimum and supplied to the middle lower electrode 132-4, the LC molecules of the LC layer 132-3 are arranged shown as in FIG. 4, and accordingly the refractive index difference of the lights passed through the LC layer 132-3 shows a lens-like distribution. Therefore the LC lenses 132 can make the 3D display device 100 operating in the 3D display mode.

Due to a cell gap of the LC layer 132-3 of each LC lens 132 producing great effects on brightness, contrast ratio and response time of the 3D display device 100, some designs and driving methods are developed to make the refractive index difference of the lights passed through the LC layer shows a Fresnel lens-like distribution, for example, the cell gap of the LC layer is decreased to increase the brightness and the contrast ratio of the 3D display device and decrease the response time of the LC molecules. However, due to many ball spacers usually disposed between the upper substrate and the lower substrate to maintain the cell gap of the two substrates, when all the lower electrodes of each LC lens are supplied with the driving voltages in the 3D display mode, the LC molecules adjacent to the ball spacers are arranged towards unexpected directions, shown as in FIG. 5.

FIG. 5 shows one case of the LC molecules arranged towards the unexpected directions. Referring to FIG. 5, the LC lens 500 operates in the 3D display mode, and the refractive index difference of the lights passed through the LC layer of the LC lens 500 shows a Fresnel lens-like distribution (labeled as 502). However, duo to the LC molecules 506 in a region 504 effected by the adjacent ball spacers (not shown), the LC molecules 506 is not tilted towards an ideal direction (in an ideal design of a Fresnel lens, all the LC molecules are tilted towards a center of a main lobe region of the Fresnel lens, that is, a center of the Fresnel lens), but is tilted towards edges of the Fresnel lens. Therefore, when the LC lens array employing the LC lenses 500 are used to display a 3D image, discontinuity lines of the edges of some LC lenses 500 in the 3D image will shift, and result in more new discontinuity lines being produced, that is, so-called dotted Mura is produced, shown as in FIG. 6.

FIG. 6 shows one case of the Mura. Referring to FIG. 6, numeral 602 represents a ball spacer, and numeral 604 represents a discontinuity line. Shown as in FIG. 6, the discontinuity line 604 is anomalous due to the ball spacer 602, and cannot show a linear distribution like other parallel discontinuity lines.

SUMMARY OF INVENTION

An exemplary embodiment of the present invention provides an LC lens device. The LC lens device includes an LC lens array including a plurality of LC lenses in parallel, and a driving device. Each LC lens includes a first substrate, a plurality of first electrodes disposed on a first surface of the first substrate, a second substrate, a plurality of second electrodes disposed on a second surface of the second substrate and the second surface opposite to the first surface, and an LC layer disposed between the first electrodes and the second electrodes to form a Fresnel lens. The Fresnel lens includes a main lobe region and a plurality of side lobe regions, and the second electrodes are divided into four groups respectively defined as a first group, a second group, a third group and a fourth group. The second electrodes of the first group are disposed in the main lobe region, each of the second electrodes of the second group is disposed at edges of the Fresnel lens, each of the second electrodes of the third group is disposed at a junction of the main lobe region and one side lobe region, or a junction of two adjacent side lobe regions, and each of the second electrodes of the fourth group is disposed in one side lobe region. The driving device is electrically connected to the second electrodes of each LC lens, and provides driving voltages respectively to each of the second electrodes in an order starting from the second electrodes disposed at the edges of the Fresnel lens and ending at the second electrode disposed at the middle of the main lobe region, and there is a preset time difference between driven starting times of every adjacent two second electrodes.

Another exemplary embodiment of the present invention provides a method for driving an LC lens. The LC lens includes a first substrate, a plurality of first electrodes disposed on a first surface of the first substrate, a second substrate, a plurality of second electrodes disposed on a second surface of the second substrate and the second surface opposite to the first surface, and an LC layer disposed between the first electrodes and the second electrodes to form a Fresnel lens. The Fresnel lens includes a main lobe region and a plurality of side lobe regions, and the second electrodes are divided into four groups respectively defined as a first group, a second group, a third group and a fourth group. The second electrodes of the first group are disposed in the main lobe region, each of the second electrodes of the second group is disposed at edges of the Fresnel lens, each of the second electrodes of the third group is disposed at a junction of the main lobe region and one side lobe region, or a junction of two adjacent side lobe regions, and each of the second electrodes of the fourth group is disposed in one side lobe region. The method includes providing driving voltages respectively to each of the second electrodes in an order starting from the second electrodes disposed at the edges of the Fresnel lens and ending at the second electrode disposed at the middle of the main lobe region, and a preset time difference is between driven starting times of every adjacent two second electrodes.

More another exemplary embodiment of the present invention provides an LC lens device. The LC lens device includes an LC lens array including a plurality of LC lenses in parallel, and a driving device. Each LC lens includes a first substrate, a plurality of first electrodes disposed on a first surface of the first substrate, a second substrate, a plurality of second electrodes disposed on a second surface of the second substrate and the second surface opposite to the first surface, and an LC layer disposed between the first electrodes and the second electrodes to form a Fresnel lens. The Fresnel lens includes a main lobe region and a plurality of side lobe regions, and the second electrodes are divided into four groups respectively defined as a first group, a second group, a third group and a fourth group. The second electrodes of the first group are disposed in the main lobe region, each of the second electrodes of the second group is disposed at edges of the Fresnel lens, each of the second electrodes of the third group is disposed at a junction of the main lobe region and one side lobe region, or a junction of two adjacent side lobe regions, and each of the second electrodes of the fourth group is disposed in one side lobe region. The driving device is electrically connected to the second electrodes of each LC lens, and simultaneously provides adjusted driving voltages respectively to the second electrodes of each of the groups during a preset period. The adjusted driving voltages respectively provided to the second electrodes of the second group increase a first preset percentage over an original driving voltage, the adjusted driving voltages respectively provided to the second electrodes of the third group decrease a second preset percentage below the original driving voltage, the adjusted driving voltage provided to each of the second electrodes of the fourth group is a result of an absolute value being divided by two, where the absolute value is obtained from a difference value between the adjusted voltage of a second electrode of the second group nearest to the second electrode of the fourth group and the adjusted voltage of a second electrode of the third group nearest to the second electrode of the fourth group, or the absolute value is obtained from a difference value between the adjusted voltages of two second electrode of the third group nearest to the second electrode of the fourth group. The preset period is equal to a result of a response time of LC molecules in the LC lens multiplying a third preset percentage.

More again another exemplary embodiment of the present invention provides a method for driving an LC lens. The LC lens includes a first substrate, a plurality of first electrodes disposed on a first surface of the first substrate, a second substrate, a plurality of second electrodes disposed on a second surface of the second substrate and the second surface opposite to the first surface, and an LC layer disposed between the first electrodes and the second electrodes to form a Fresnel lens. The Fresnel lens includes a main lobe region and a plurality of side lobe regions, and the second electrodes are divided into four groups respectively defined as a first group, a second group, a third group and a fourth group. The second electrodes of the first group are disposed in the main lobe region, each of the second electrodes of the second group is disposed at edges of the Fresnel lens, each of the second electrodes of the third group is disposed at a junction of the main lobe region and one side lobe region, or a junction of two adjacent side lobe regions, and each of the second electrodes of the fourth group is disposed in one side lobe region. The method includes simultaneously providing adjusted driving voltages respectively to the second electrodes of each of the groups during a preset period. The adjusted driving voltages respectively provided to the second electrodes of the second group increase a first preset percentage over an original driving voltage, the adjusted driving voltages respectively provided to the second electrodes of the third group decrease a second preset percentage below the original driving voltage, the adjusted driving voltage provided to each of the second electrodes of the fourth group is a result of an absolute value being divided by two, where the absolute value is obtained from a difference value between the adjusted voltage of a second electrode of the second group nearest to the second electrode of the fourth group and the adjusted voltage of a second electrode of the third group nearest to the second electrode of the fourth group, or the absolute value is obtained from a difference value between the adjusted voltages of two second electrode of the third group nearest to the second electrode of the fourth group. The preset period is equal to a result of a response time of LC molecules in the LC lens multiplying a third preset percentage.

BRIEF DESCRIPTION OF THE DRAWINGS

FIG. 9 shows an essential step of a method for driving an LC lens according to an embodiment of the present invention.

DETAILED DESCRIPTION OF EMBODIMENTS

Figure 1:
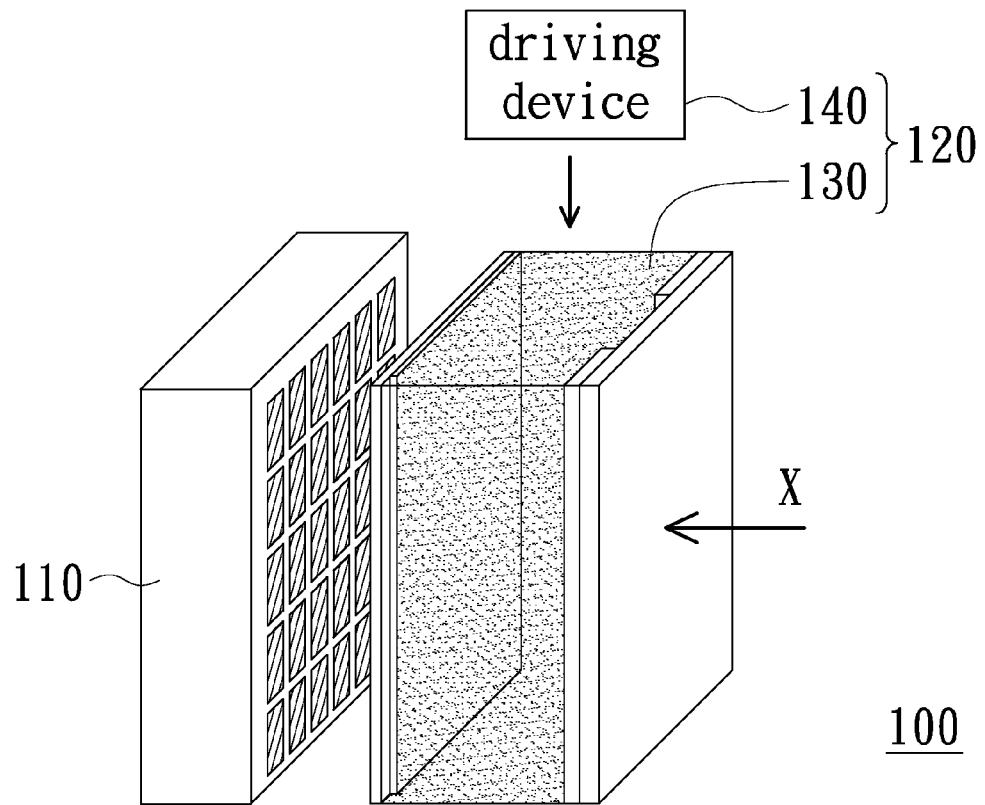
FIG. 1 is a schematic view of a conventional 3D display device, and the 3D display device includes an LC lens array.
Figure 2:
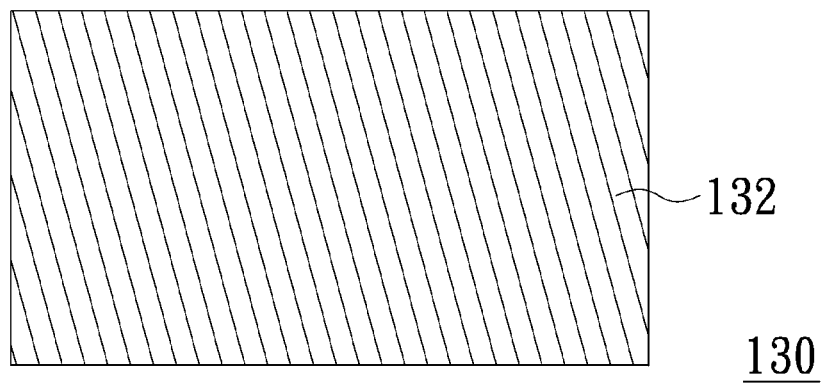
FIG. 2 is a top view of the LC lens array along a direction X of FIG. 1, and the LC lens array includes a plurality of LC lens.
Figure 3:
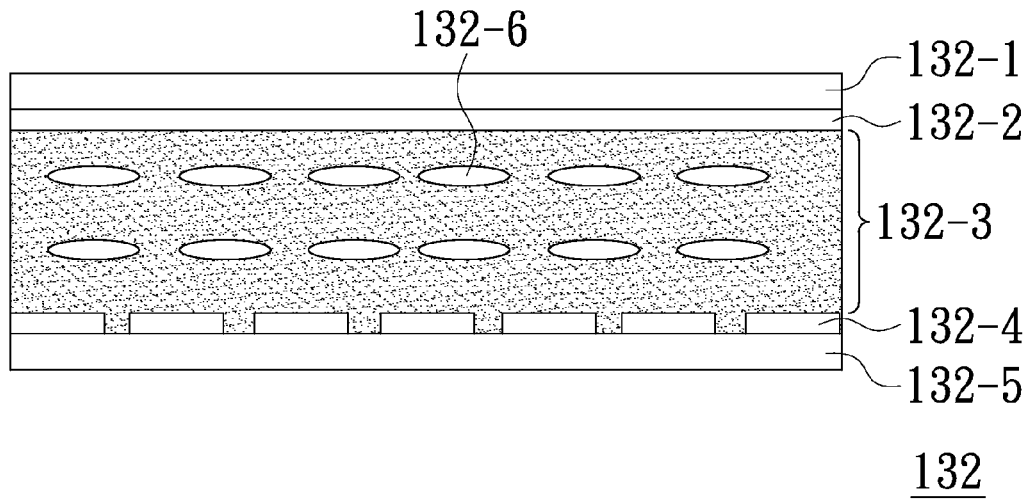
FIG. 3 is a schematic cross-sectional view of each LC lens in a 2D display mode.
Figure 4:
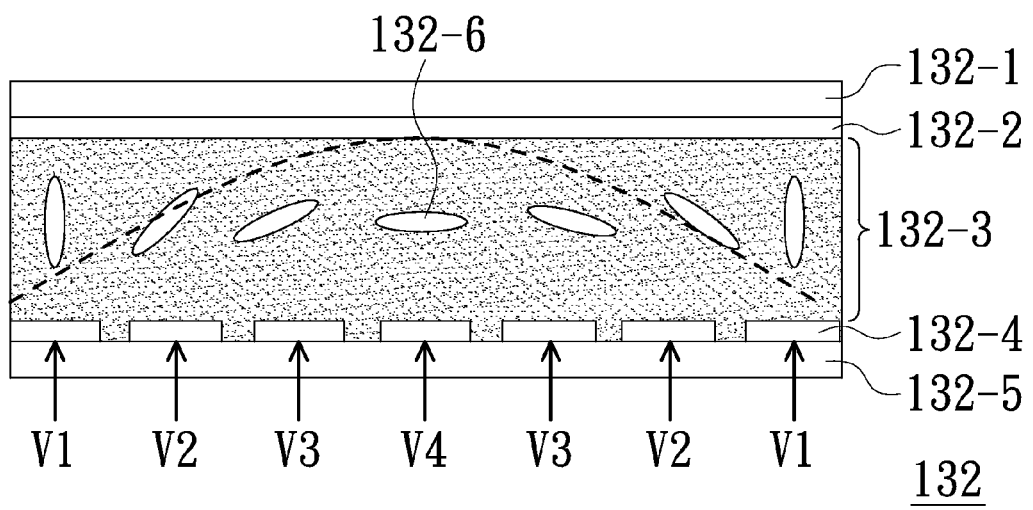
FIG. 4 is a schematic cross-sectional view of each LC lens in a 3D display mode.
Figure 5:
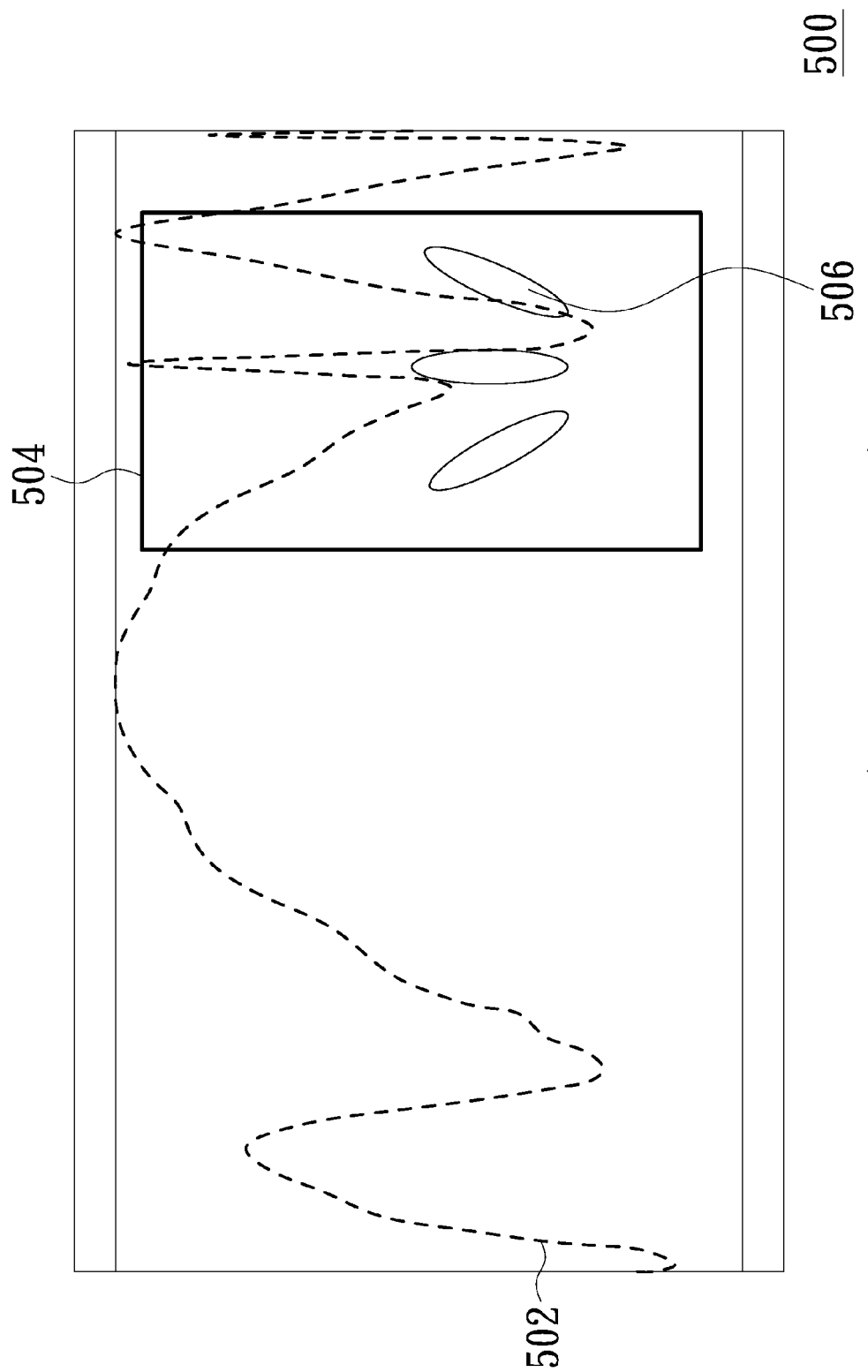
FIG. 5 shows one case of LC molecules arranged towards unexpected directions.
Figure 6:
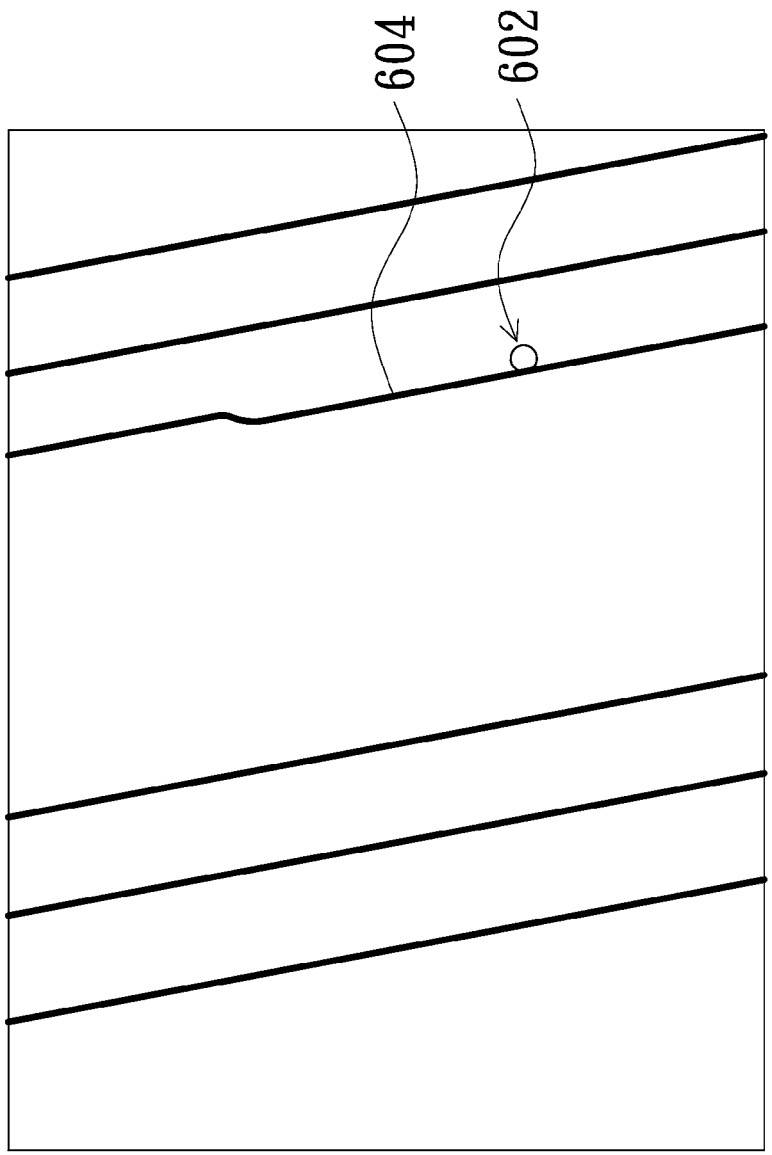
FIG. 6 shows one case of Mura.
Figure 7:
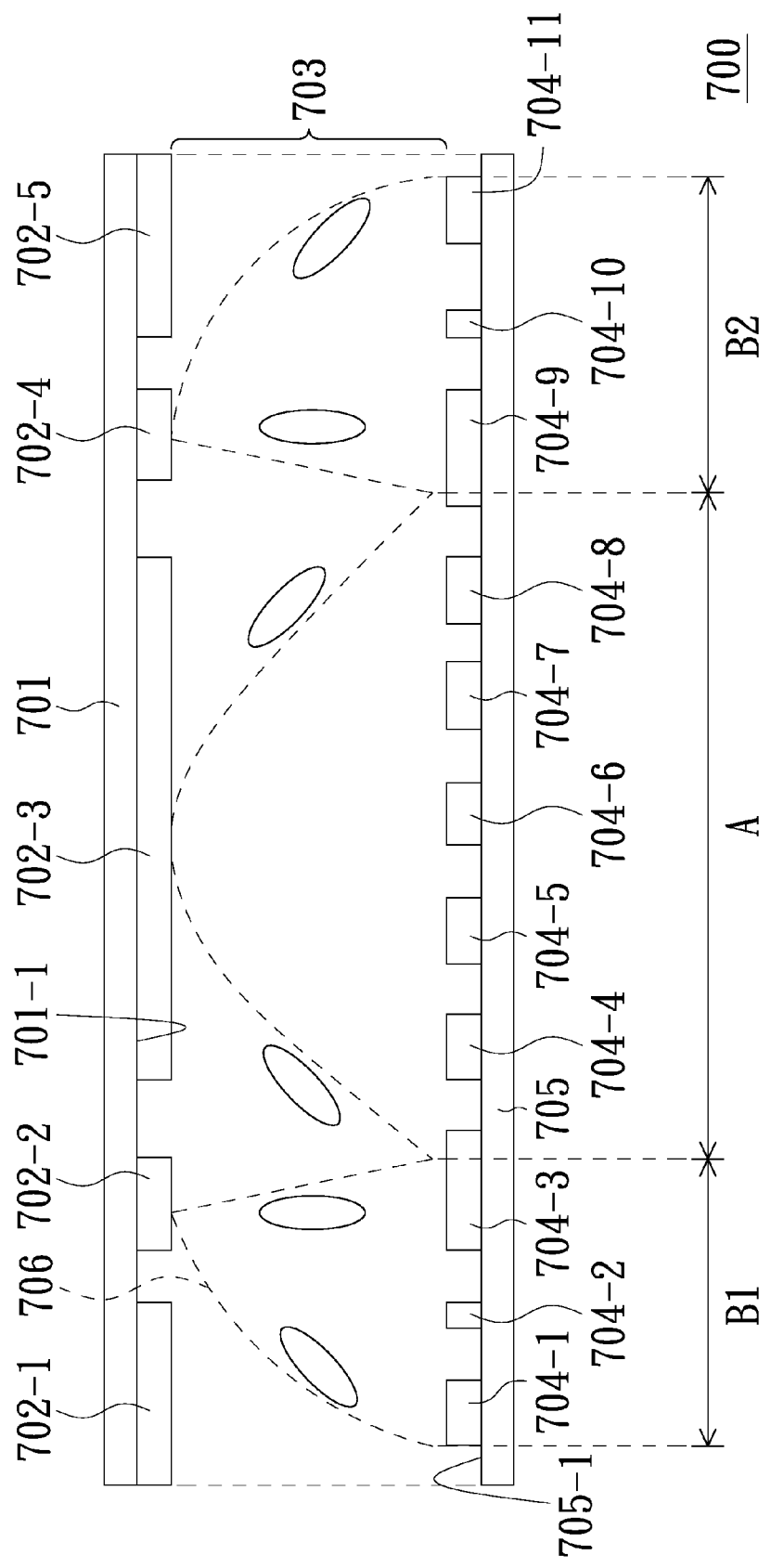
FIG. 7 is a schematic cross-sectional view of an LC lens according to an embodiment of the present invention, and the LC lens included a plurality of second electrodes.

An LC lens device (similar to the LC lens device 120 shown in FIG. 1) of the present invention includes an LC lens array (similar to the LC lens array 130 shown in FIG. 1) and a driving device (similar to the driving device 140 shown in FIG. 1), and the LC lens array includes a plurality of an LC lenses in parallel. FIG. 7 is a schematic cross-sectional view of an LC lens according to an embodiment of the present invention. Referring to FIG. 7, each LC lens 700 includes a first (or upper) substrate 701, a plurality of first (or upper) electrodes 702-1 through 702-5, an LC layer 703, a plurality of second (or lower) electrodes 704-1 through 704-11, and a second (or lower) substrate 705. Each of the second electrodes 704-1 through 704-11 is electrically connected the driving device to receive driving voltages provided by the driving device.

The first electrodes 702-1 through 702-5 are disposed on a surface 701-1 of the first substrate 701 adjacent to the LC layer 703, and the second electrodes 704-1 through 704-11 are disposed on a surface 705-1 of the second substrate 705 adjacent to the LC layer 703. The surface 701-1 is opposite to the surface 705-1 relative to the LC layer 703, and the LC layer 703 is disposed between the first substrate 701 adjacent to the LC layer 703 and the second electrodes 704-1 through 704-11 to form a Fresnel lens 706 when the driving voltages are provided by the driving device. The Fresnel lens 706 includes a main lobe region A and two side lobe regions B1 and B2, and the two side lobe regions B1 and B2 are respectively at two opposite sides (the left side and the right side shown in FIG. 7) of the main lobe region A. In addition, the second electrodes 704-1 through 704-11 are divided into four groups respectively defined as a first group, a second group, a third group and a fourth group. The second electrodes of the first group are disposed in the main lobe region A, in other words, the first group includes the second electrodes 704-4 through 704-8. Each of the second electrodes of the second group is disposed at a corresponding edge of the Fresnel lens 706, in other words, the second group includes the second electrode 704-1 disposed at one edge (the left edge of the Fresnel lens 706 shown in FIG. 7) and the second electrode 704-11 disposed at another edge (the right edge of the Fresnel lens 706 shown in FIG. 7). Each of the second electrodes of the third group is disposed at a junction of the main lobe region A and the side lobe region B1 or B2, in other words, the third group includes the second electrode 704-3 disposed at the junction of the main lobe region A and the side lobe region B1 and the second electrode 704-9 disposed at the junction of the main lobe region A and the side lobe region B2. Each of the second electrodes of the fourth group is disposed in the side lobe region B1 or B2, in other words, the fourth group includes the second electrode 704-2 disposed in the side lobe region B1 and the second electrode 704-10 disposed in the side lobe region B2.

The driving device (not shown) is electrically connected all the second electrodes of each LC lens 700. The driving device provides driving voltages respectively to each of the second electrodes in an order starting from the second electrodes 704-1 and 704-11 disposed at the edges of the Fresnel lens 706 and ending at the second electrode 704-6 disposed at the middle of the Fresnel lens 706 (or the main lobe region A), and there is a preset time difference between driven starting times of every adjacent two second electrodes, illustrated in FIG. 8.

Figure 8:
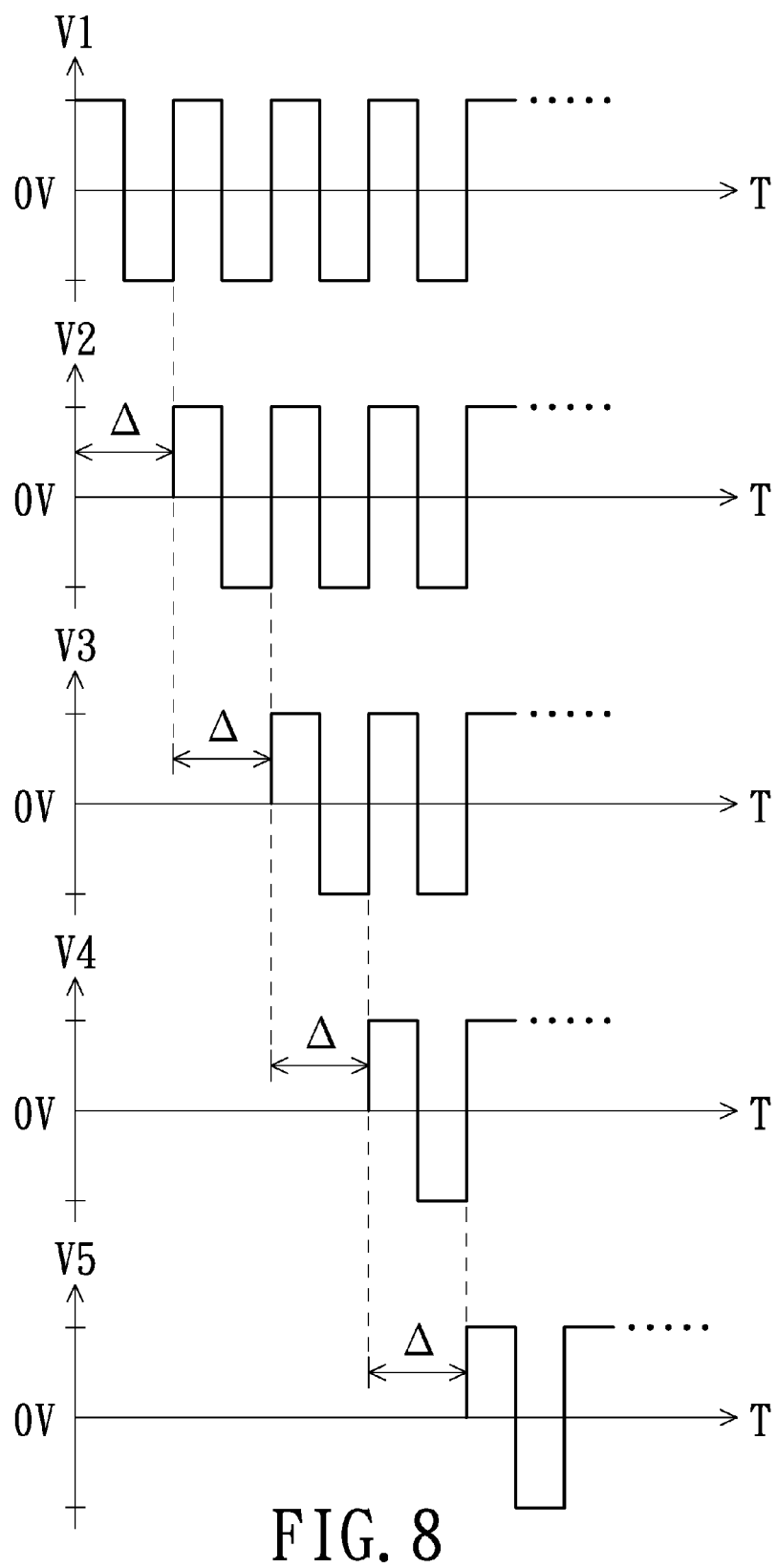
FIG. 8 is a timing diagram of driving voltages of the second electrodes in FIG. 7.

FIG. 8 is a timing diagram of the driving voltages of the second electrodes of each LC lens 700. Referring to FIG. 8, label V1 represents the driving voltages provided by the driving device to the second electrodes 704-1 and 704-11 of the second group, label V2 represents the driving voltages provided by the driving device to the second electrodes 704-2 and 704-10 of the fourth group, label V3 represents the driving voltages provided by the driving device to the second electrodes 704-3 and 704-9 of the third group, label V4 represents the driving voltages provided by the driving device to the second electrodes 704-4 and 704-8 of the first group, label V5 represents the driving voltages provided by the driving device to the second electrodes 704-5 and 704-7 of the first group, label T represents time, and the label A represents the preset time difference. In this embodiment, waveforms of the driving voltages V1 through V5 are equiphase alternating current (AC) square waves, and amplitudes of the driving voltages V1 through V5 are equal, however, the present invention is not limited to these. Furthermore, in this embodiment, frequencies of the driving voltages V1 through V5 are more than 30 Hz, and are preferably equal to 60 Hz or 120 Hz. In addition, in this embodiment, the preset time difference Δ is equal to a result of a response time of LC molecules in the LC lens 700 multiplying a preset percentage, and the preset percentage is preferably equal to 25%, however, the present invention is not limited to the preset percentage.

Shown as in FIG. 8, when each LC lens 700 is driven, there is a preset time difference Δ between the driven starting times of every adjacent two second electrodes. Therefore, the LC molecules in each LC lens 700 can be arranged towards an ideal direction (that is, the LC molecules in each LC lens 700 can be tilted towards a center of the main lobe region A of the Fresnel lens 706), and the dotted Mura is accordingly not produced or decreases when the LC lens device of the present invention is used to display a 3D image.

Even though in the above embodiment, each LC lens 700 has two side lobe regions, in other embodiments, each LC lens can have not less than four side lobe regions. For example, each LC lens can have four side lobe regions (two side lobe regions at the left side of the main lobe region, and the other two side lobe regions at the right side of the main lobe region), or each LC lens can have six side lobe regions (three side lobe regions at the left side of the main lobe region, and the other three side lobe regions at the right side of the main lobe region). In those embodiments, the second electrodes are disposed at the junctions of two side lobe regions also belong to the third group. In addition, in another embodiment, a plurality of second electrodes can be disposed in the same side lobe region, and each side lobe region can includes the plurality of second electrodes of the fourth group. It must be noted that, no matter in which embodiment, a method for diving each LC lens by setting a preset time difference Δ between the driven starting times of every adjacent two second electrodes can be employed, to make the LC molecules in each LC lens 700 tilted towards the center of the main lobe region of the Fresnel lens.

Due to the above embodiments, it can be obtained that a method for driving the above LC lens of the present invention includes an essential step, shown as in FIG. 9. FIG. 9 shows the essential step of the method for driving an LC lens according to an embodiment of the present invention. The LC lens includes a first substrate, a plurality of first electrodes, a second substrate, a plurality of second electrodes, and an LC layer. The first electrodes are disposed on a first surface of the first substrate adjacent to the LC layer, the second electrodes are disposed on a second surface of the second substrate adjacent to the LC layer, the second surface is opposite to the first surface relative to the LC layer, and the LC layer is disposed between the first electrodes and the second electrodes to form a Fresnel lens. The Fresnel lens includes a main lobe region and a plurality of side lobe regions. The second electrodes are divided into four groups respectively defined as a first group, a second group, a third group and a fourth group. All the second electrodes of the first group are disposed in the main lobe region. Each of the second electrodes of the second group is disposed at a corresponding edge of the Fresnel lens. Each of the second electrodes of the third group is disposed at a junction of the main lobe region and one side lobe region at one side of the main lobe region, or a junction of two adjacent side lobe regions. Each of the second electrodes of the fourth group is disposed in one side lobe region. Referring to FIG. 9, the method for driving the LC lens includes a step S902: providing driving voltages respectively to each of the second electrodes in an order starting from the second electrodes disposed at the edges of the Fresnel lens and ending at the second electrode disposed at the middle of the main lobe region, and there is a preset time difference between driven starting times of every adjacent two second electrodes.

Figure 10:
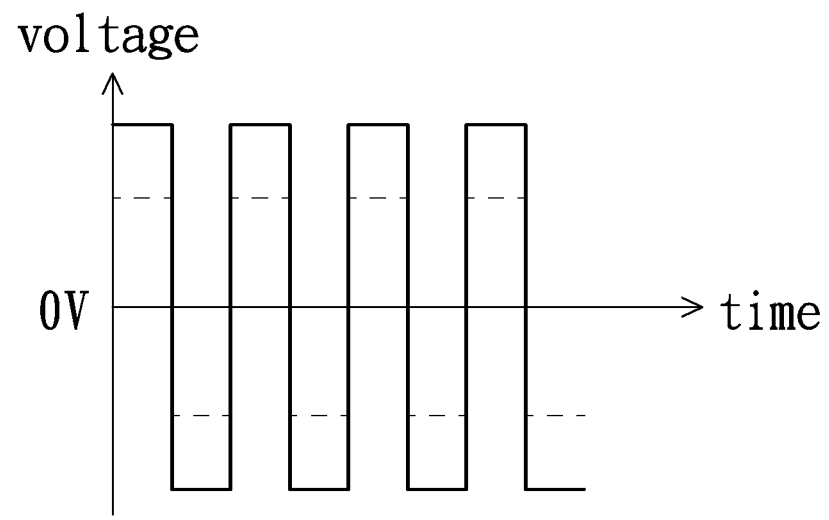
FIG. 10 shows a waveform of an original driving voltage and a waveform of an adjusted driving voltage by increasing a first preset percentage over the original driving voltage.
Figure 11:
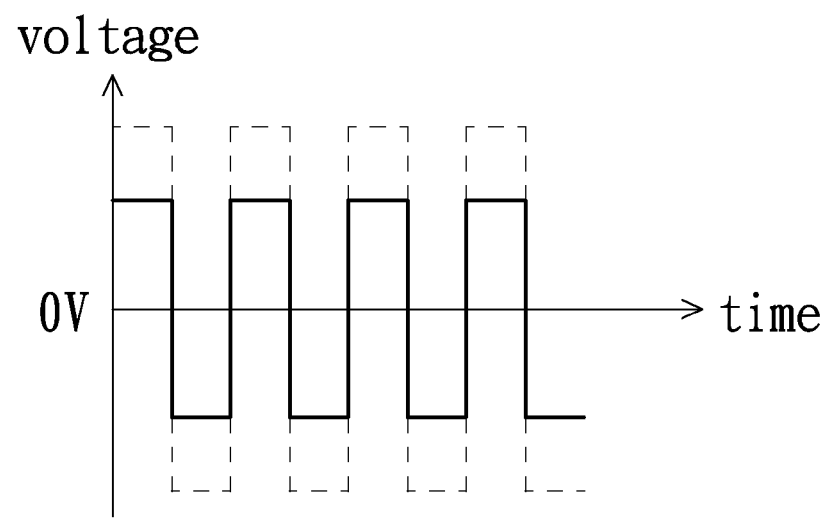
FIG. 11 shows the waveform of the original driving voltage and a waveform of an adjusted driving voltage by decreasing a second preset percentage below the original driving voltage.

Besides employing the above method to eliminate or diminish the dotted Mura when the LC lens device is used to display a 3D image, a method according to another embodiment of the present invention also can achieve the same advantages. That is, the driving device simultaneously provides adjusted driving voltages having different voltage values respectively to the second electrodes of each of the groups of each LC lens 700 during a preset period. Referring again to FIG. 7, first, the driving device simultaneously provides the adjusted driving voltages respectively to the second electrodes 704-1 through 704-11 during the preset period, where the adjusted driving voltages respectively provided to the second electrodes 704-1 and 704-11 of the second group increase a first preset percentage over an original driving voltage, and the adjusted driving voltages respectively provided to the second electrodes 704-3 and 704-9 of the third group decrease a second preset percentage below the original driving voltage, respectively shown as in FIGS. 10 and 11 for example. FIG. 10 shows a waveform of the original driving voltage and a waveform of the adjusted driving voltage by increasing the first preset percentage over the original driving voltage. Referring to FIG. 10, dotted line depicts the waveform of the original driving voltage, and solid line depicts the waveform of the adjusted driving voltage by increasing the first preset percentage over the original driving voltage. FIG. 11 shows the waveform of the original driving voltage and a waveform of the adjusted driving voltage by decreasing the second preset percentage below the original driving voltage. Referring to FIG. 11, dotted line depicts the waveform of the original driving voltage, and solid line depicts the waveform of the adjusted driving voltage by decreasing the second preset percentage below the original driving voltage.

In addition, the adjusted driving voltage provided to each of the second electrodes 704-2 and 704-10 of the fourth group is a result of an absolute value being divided by two, where the absolute value is obtained from a difference value between the adjusted voltage of a second electrode of the second group nearest to the second electrode of the fourth group and the adjusted voltage of a second electrode of the third group nearest to the second electrode of the fourth group. Taking the second electrodes 704-2 as an example, the adjusted driving voltage provided to the second electrodes 704-2 is the result of an absolute value being divided by two, and the absolute value is obtained from the difference value between the adjusted voltage of the second electrode 704-1 of the second group and the adjusted voltage of the second electrode 704-3 of the third group, because the second electrode 704-1 of the second group and the second electrode 704-3 of the third group are nearest to the second electrodes 704-2 of the fourth group. In other embodiments, when the LC lens includes more than four side lobe regions, the adjusted driving voltage provided to one of some second electrodes of the fourth group is a result of an absolute value being divided by two, and the absolute value is obtained from the difference value between the adjusted voltages of two second electrode of the third group nearest to the second electrode of the fourth group.

The preset period is equal to a result of a response time of LC molecules in the LC lens multiplying a third preset percentage. After the preset period, the driving device provides the original driving voltage to the second electrodes. In this embodiment, the first preset percentage is not less than 6%, the second preset percentage is not less than 10%, and the third preset percentage is preferably equal to 25%, however, the present invention is not limited to those preset percentages.

Figure 12:
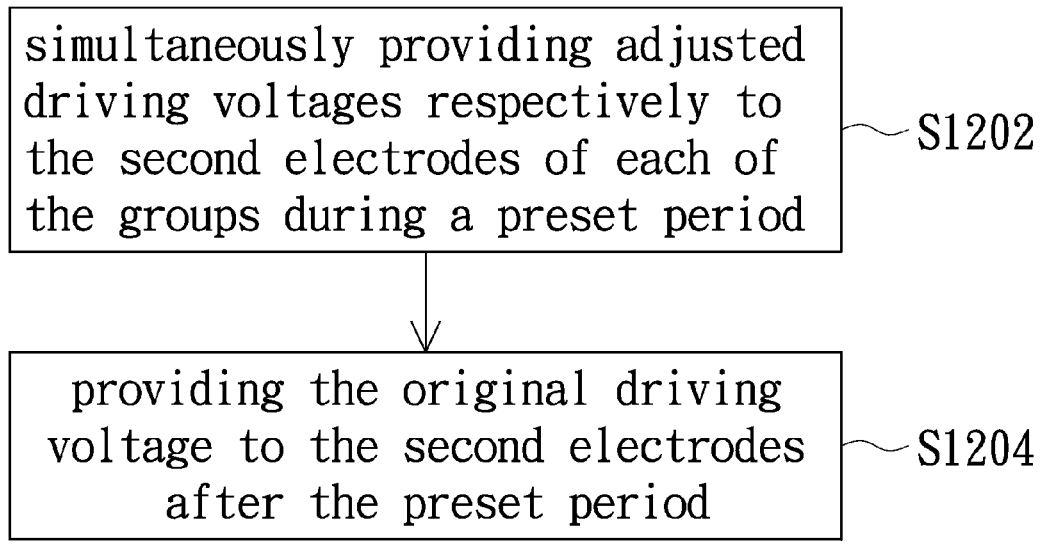
FIG. 12 shows main steps of a method for driving an LC lens according to another embodiment of the present invention.

Therefore, the method for driving the LC lens according to another embodiment of the present invention can be obtained, shown as in FIG. 12. FIG. 12 shows main steps of the method for driving an LC lens according to another embodiment of the present invention. The LC lens includes a first substrate, a plurality of first electrodes, a second substrate, a plurality of second electrodes, and an LC layer. The first electrodes are disposed on a first surface of the first substrate adjacent to the LC layer, the second electrodes are disposed on a second surface of the second substrate adjacent to the LC layer, the second surface is opposite to the first surface relative to the LC layer, and the LC layer is disposed between the first electrodes and the second electrodes to form a Fresnel lens. The Fresnel lens includes a main lobe region and a plurality of side lobe regions. The second electrodes are divided into four groups respectively defined as a first group, a second group, a third group and a fourth group. All the second electrodes of the first group are disposed in the main lobe region. Each of the second electrodes of the second group is disposed at a corresponding edge of the Fresnel lens. Each of the second electrodes of the third group is disposed at a junction of the main lobe region and one side lobe region at one side of the main lobe region, or a junction of two adjacent side lobe regions. Each of the second electrodes of the fourth group is disposed in one side lobe region.

Referring to FIG. 12, the method for driving the LC lens includes steps S1202 and S1204. Step S1202 is simultaneously providing adjusted driving voltages respectively to the second electrodes of each of the groups during a preset period, where the adjusted driving voltages respectively provided to the second electrodes of the second group increase a first preset percentage over an original driving voltage, the adjusted driving voltages respectively provided to the second electrodes of the third group decrease a second preset percentage below the original driving voltage, and the adjusted driving voltage provided to each of the second electrodes of the fourth group is a result of an absolute value being divided by two, where the absolute value is obtained from a difference value between the adjusted voltage of a second electrode of the second group nearest to the second electrode of the fourth group and the adjusted voltage of a second electrode of the third group nearest to the second electrode of the fourth group, or the absolute value is obtained from a difference value between the adjusted voltages of two second electrode of the third group nearest to the second electrode of the fourth group, and the preset period is equal to a result of a response time of LC molecules in the LC lens multiplying a third preset percentage. Step S 1204 is providing the original driving voltage to the second electrodes after the preset period.

In summary, the LC array lens device and the method for driving the LC array lens device according to one embodiment of the present invention provides driving voltages respectively to each of the second electrodes of each LC lens in an order starting from the second electrodes disposed at the edges of the Fresnel lens and ending at the second electrode disposed at the middle of the main lobe region, and there is a preset time difference between driven starting times of every adjacent two second electrodes. Therefore, the LC molecules in each LC lens can be arranged towards the ideal direction, and the dotted Mura is accordingly not produced or decreases when the LC lens device of the present invention is used to display a 3D image. Furthermore, the LC array lens device and the method for driving the LC array lens device according to another embodiment of the present invention simultaneously provides adjusted driving voltages having different voltage values respectively to the second electrodes of each of the groups of each LC lens during a preset period. Therefore, the LC molecules in each LC lens also can be arranged towards the ideal direction, and the dotted Mura is accordingly not produced or decreases when the LC lens device of the present invention is used to display a 3D image.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal (LC) lens device, comprising:
    an LC lens array comprising a plurality of LC lenses in parallel, each LC lens comprising:
    a first substrate;
    a plurality of first electrodes disposed on a first surface of the first substrate;
    a second substrate;
    a plurality of second electrodes disposed on a second surface of the second substrate, the second surface opposite to the first surface; and
    an LC layer disposed between the first electrodes and the second electrodes to form a Fresnel lens; wherein the Fresnel lens comprises a main lobe region and a plurality of side lobe regions, the second electrodes are divided into four groups respectively defined as a first group, a second group, a third group and a fourth group, the second electrodes of the first group are disposed in the main lobe region, each of the second electrodes of the second group is disposed at edges of the Fresnel lens, each of the second electrodes of the third group is disposed at a junction of the main lobe region and one side lobe region, or a junction of two adjacent side lobe regions, and each of the second electrodes of the fourth group is disposed in one side lobe region; and
    a driving device electrically connected to the second electrodes of each LC lens, wherein the driving device provides driving voltages respectively to each of the second electrodes in an order starting from the second electrodes disposed at the edges of the Fresnel lens and ending at the second electrode disposed at the middle of the main lobe region, and there is a preset time difference between driven starting times of every adjacent two second electrodes,
    wherein the preset time difference is equal to a result of a response time of LC molecules in each LC lens multiplying a preset percentage.

2. The LC lens device as claimed in claim 1, wherein the preset percentage is equal to 25%.

3. The LC lens device as claimed in claim 1, wherein each side lobe region comprises a plurality of second electrodes of the fourth group.

4. A method for driving a liquid crystal (LC) lens, the LC lens comprising a first substrate, a plurality of first electrodes disposed on a first surface of the first substrate, a second substrate, a plurality of second electrodes disposed on a second surface of the second substrate, the second surface opposite to the first surface, an LC layer disposed between the first electrodes and the second electrodes to form a Fresnel lens, the Fresnel lens comprising a main lobe region and a plurality of side lobe regions, the second electrodes being divided into four groups respectively defined as a first group, a second group, a third group and a fourth group, the second electrodes of the first group disposed in the main lobe region, each of the second electrodes of the second group disposed at edges of the Fresnel lens, each of the second electrodes of the third group disposed at a junction of the main lobe region and one side lobe region, or a junction of two adjacent side lobe regions, and each of the second electrodes of the fourth group disposed in one side lobe region; and the method comprising:
    providing driving voltages respectively to each of the second electrodes in an order starting from the second electrodes disposed at the edges of the Fresnel lens and ending at the second electrode disposed at the middle of the main lobe region, and a preset time difference being between driven starting times of every adjacent two second electrodes, wherein the preset time difference is equal to a result of a response time of LC molecules in each LC lens multiplying a preset percentage.

5. The method as claimed in claim 4, wherein the preset percentage is equal to 25%.

6. The method as claimed in claim 4, wherein each side lobe region comprises a plurality of second electrodes of the fourth group.

7. A liquid crystal (LC) lens device, comprising:
    an LC lens array comprising: a plurality of LC lenses in parallel, each LC lens comprising:
    a first substrate;
    a plurality of first electrodes disposed on a first surface of the first substrate;
    a second substrate;
    a plurality of second electrodes disposed on a second surface of the second substrate, the second surface opposite to the first surface; and
    an LC layer disposed between the first electrodes and the second electrodes to form a Fresnel lens; wherein the Fresnel lens comprises a main lobe region and a plurality of side lobe regions, the second electrodes are divided into four groups respectively defined as a first group, a second group, a third group and a fourth group, the second electrodes of the first group are disposed in the main lobe region, each of the second electrodes of the second group is disposed at edges of the Fresnel lens, each of the second electrodes of the third group is disposed at a junction of the main lobe region and one side lobe region, or a junction of two adjacent side lobe regions, and each of the second electrodes of the fourth group is disposed in one side lobe region; and
    a driving device electrically connected to the second electrodes, wherein the driving device simultaneously provides adjusted driving voltages respectively to the second electrodes of each of the groups during a preset period, the adjusted driving voltages respectively provided to the second electrodes of the second group increase a first preset percentage over an original driving voltage, the adjusted driving voltages respectively provided to the second electrodes of the third group decrease a second preset percentage below the original driving voltage, the adjusted driving voltage provided to each of the second electrodes of the fourth group is a result of an absolute value being divided by two, where the absolute value is obtained from a difference value between the adjusted voltage of a second electrode of the second group nearest to the second electrodes of the fourth group and the adjusted voltage of a second electrode of the third group nearest to the second electrode of the fourth group, or the absolute value is obtained from a difference value between the adjusted voltages of two of the second electrodes of the third group nearest to the second electrode of the fourth group, and the preset period is equal to a result of a response time of LC molecules in the LC lens multiplying a third preset percentage.

8. The LC lens device as claimed in claim 7, wherein the first preset percentage is less than 6%.

9. The LC lens device as claimed in claim 7, wherein the second preset percentage is less than 10%.

10. The LC lens device as claimed in claim 7, wherein the third preset percentage is equal to 25%.

11. The LC lens device as claimed in claim 7, wherein each side lobe region comprises a plurality of second electrodes of the fourth group.

12. The LC lens device as claimed in claim 7, wherein the driving device provides the original driving voltage to the second electrodes after the preset period.

13. A method for driving a liquid crystal (LC) lens, the LC lens comprising: a first substrate, a plurality of first electrodes disposed on a first surface of the first substrate, a second substrate, a plurality of second electrodes disposed on a second surface of the second substrate, the second surface opposite to the first surface, an LC layer disposed between the first electrodes and the second electrodes to form a Fresnel lens, the Fresnel lens comprising a main lobe region and a plurality of side lobe regions, the second electrodes being divided into four groups respectively defined as a first group, a second group, a third group and a fourth group, the second electrodes of the first group disposed in the main lobe region, each of the second electrodes of the second group disposed at edges of the Fresnel lens, each of the second electrodes of the third group disposed at a junction of the main lobe region and one side lobe region, or a junction of two adjacent side lobe regions, and each of the second electrodes of the fourth group disposed in one side lobe region; and the method further comprising:

simultaneously providing adjusted driving voltages respectively to the second electrodes of each of the groups during a preset period, wherein the adjusted driving voltages respectively provided to the second electrodes of the second group increase a first preset percentage over an original driving voltage, the adjusted driving voltages respectively provided to the second electrodes of the third group decrease a second preset percentage below the original driving voltage, the adjusted driving voltage provided to each of the second electrodes of the fourth group is a result of an absolute value being divided by two, where the absolute value is obtained from a difference value between the adjusted voltage of a second electrode of the second group nearest to the second electrodes of the fourth group and the adjusted voltage of a second electrode of the third group nearest to the second electrode of the fourth group, or the absolute value is obtained from a difference value between the adjusted voltages of two of the second electrodes of the third group nearest to the second electrode of the fourth group, and the preset period is equal to a result of a response time of LC molecules in the LC lens multiplying a third preset percentage.

14. The method as claimed in claim 13, further comprising providing the original driving voltage to the second electrodes after the preset period.

15. The method as claimed in claim 14, wherein the first preset percentage is less than 6%.

16. The method as claimed in claim 14, wherein the second preset percentage is less than 10%.

17. The method as claimed in claim 14, wherein the third preset percentage is equal to 25%.

18. The method as claimed in claim 14, wherein the driving device provides the original driving voltage to the second electrodes after the preset period.

\* \* \* \* \*